United States Patent
Tomita et al.

(10) Patent No.: US 8,483,955 B2
(45) Date of Patent: Jul. 9, 2013

(54) NAVIGATION SYSTEM FOR A VEHICLE

(75) Inventors: Hiroshi Tomita, Anjo Aichi (JP);
Junichiro Igawa, Okazaki Aichi (JP)

(73) Assignee: Aisin AW Co., Ltd., Anjo-shi (JP)

( * ) Notice: Subject to any disclaimer, the term of this patent is extended or adjusted under 35 U.S.C. 154(b) by 1130 days.

(21) Appl. No.: 11/885,342

(22) PCT Filed: Mar. 29, 2006

(86) PCT No.: PCT/JP2006/306556
§ 371 (c)(1),
(2), (4) Date: May 12, 2008

(87) PCT Pub. No.: WO2006/106777
PCT Pub. Date: Oct. 12, 2006

(65) Prior Publication Data
US 2009/0024322 A1    Jan. 22, 2009

(30) Foreign Application Priority Data

Mar. 30, 2005 (JP) ................................ 2005-098376

(51) Int. Cl.
*G01C 21/36* (2006.01)
(52) U.S. Cl.
USPC ............ 701/428; 701/412; 701/418; 701/423
(58) Field of Classification Search
USPC .......... 701/213, 209, 207, 117, 428; 348/118; 340/995.13; 1/1
See application file for complete search history.

(56) References Cited

U.S. PATENT DOCUMENTS

| | | | |
|---|---|---|---|
| 6,125,326 A * | 9/2000 | Ohmura et al. | 701/213 |
| 6,438,489 B1 * | 8/2002 | Greif | 701/209 |
| 6,657,558 B2 * | 12/2003 | Horita et al. | 340/995.13 |
| 7,319,931 B2 * | 1/2008 | Uyeki et al. | 701/209 |
| 2001/0027375 A1 * | 10/2001 | Machida et al. | 701/209 |
| 2002/0049531 A1 * | 4/2002 | Tanaka et al. | 701/207 |
| 2002/0194170 A1 * | 12/2002 | Israni et al. | 707/3 |
| 2003/0179110 A1 | 9/2003 | Kato | 340/988 |
| 2004/0203850 A1 * | 10/2004 | Oesterling | 455/456.1 |
| 2005/0162513 A1 * | 7/2005 | Chan | 348/118 |
| 2005/0171688 A1 * | 8/2005 | Fujita et al. | 701/201 |
| 2006/0095199 A1 * | 5/2006 | Lagassey | 701/117 |

FOREIGN PATENT DOCUMENTS

| | | |
|---|---|---|
| DE | 102 33 378 | 2/2004 |
| JP | 06-111187 | 4/1994 |

(Continued)

OTHER PUBLICATIONS

Google patents search history.*

(Continued)

*Primary Examiner* — Dilek B Cobanoglu
(74) *Attorney, Agent, or Firm* — Bacon & Thomas, PLLC (57) ABSTRACT

When a vehicle is located within the area of coverage of a radio station, a navigation system outputs audio guidance on the basis of traffic information received from the radio station, provided a predetermined audio output condition related to a congested area is satisfied or stores the traffic information in a storage section if the predetermined audio output condition is not satisfied. Then, when the vehicle is located outside of the area of coverage of the radio station, the navigation system outputs the stored traffic information as audio guidance.

18 Claims, 7 Drawing Sheets

THIS IS JH JAPAN ROAD PUBLIC CORPORATION. HERE IS CURRENT TRAFFIC INFORMATION FOR EXRESSWAY AS OF 3:50 P.M.

FOREIGN PATENT DOCUMENTS

| | | |
|---|---|---|
| JP | 10-049798 A | 2/1998 |
| JP | 11-353587 | 12/1999 |
| JP | 2000-222682 | 8/2000 |
| JP | 2001-028099 | 1/2001 |
| JP | 2001-118189 | 4/2001 |
| JP | 2002-136090 | 5/2001 |
| JP | 2002-107156 | 4/2002 |
| JP | 2002-236029 | 8/2002 |
| JP | 2002-365066 | 12/2002 |

OTHER PUBLICATIONS

Google patents search, Jan. 8, 2012.*

Jun Miura et al., "An Active Vision System for Real-Time Traffic Sign Recognition", Oct. 1-3, 2000, pp. 52-57, 2000 IEEE Intelligent Transportation Systems Conference Proceedings, Dearborn, Michigan, USA.

Japanese Office Action in JP 2007-512817 and partial translation thereof, dated Mar. 29, 2011.

* cited by examiner

NAVIGATION SYSTEM FOR A VEHICLE

TECHNICAL FIELD

The present invention relates to a navigation system for a vehicle, in particular, a navigation system for announcing traffic congestion information to the driver of the vehicle in real time.

BACKGROUND ART

Japanese Unexamined Patent Application Publication ("Kokai") No. H11 (1999)-353587 discloses a navigation apparatus comprising: a storage device for storing information pertaining to a radio station that broadcasts traffic information, such as the location of the radio station, coverage, and reception frequency; a receiver for receiving the traffic information; a control section for operating the receiver provided that both the receiver and the location of the vehicle, detected by a position detecting device, are located within the coverage of the radio station; and an information conversion device for analyzing the traffic information received by the receiver as audio data and converting the traffic information to textual information; wherein the textual information from the information conversion device is displayed on a monitor screen 2. In the disclosed navigation apparatus, road information received by a tuner section of the receiver is output from a speaker as audio guidance while the road information is analyzed by an audio recognition section of the information conversion device and displayed on the monitor screen after being converted to textual information.

In operation of the navigation apparatus disclosed in Japanese Kokai H11-353587, even if there is no congested area on a travel route while the vehicle is located within the coverage of the radio station for which data is stored in the storage device, traffic information for the travel route is automatically announced with audio guidance. Therefore, when the driver of the vehicle is listening to music, traffic information unnecessary for the driver interrupts the music. What is worse is that unnecessary audio information might decrease the driver's alertness during his/her driving, so that the driver might feel stressed. Further, the receiver in the navigation apparatus cannot receive traffic information such as traffic control information, road construction information, and/or traffic accident information after the vehicle has moved out of the area of coverage of the radio station for which data is stored. Therefore, the driver cannot obtain traffic information regarding a congested area on the travel route ahead of the vehicle.

DISCLOSURE OF INVENTION

To solve the problems described above, the present invention provides a navigation system for providing audio information to a driver regarding traffic congestion due to traffic control, a traffic accident, and/or road construction within a coverage area of a radio station along a travel route only when a predetermined audio output condition is met.

The present invention further provides a navigation apparatus for a vehicle for providing audio traffic information advising the driver of existence of a congested area due to traffic control, a traffic accident, and/or road construction whenever the driver wants such information, even if the vehicle is located out of coverage of a radio station providing traffic information.

To solve the problems described above, the present invention provides a navigation system for a vehicle, comprising: a communication section for receiving traffic information from a radio station; an audio output determining device for determining whether the traffic information which is received from the radio station by the communication section should be output, based on satisfaction of an audio output condition; and an audio output processing device for outputting the traffic information which is received from the radio station by the communication section, as audio guidance, when the audio output determining device determines that the audio output condition is met.

The navigation system described above announces the traffic information received by the communication section and provides audio guidance only when current traffic information which is received from the radio station by the communication section satisfies the preset audio output condition. Therefore, the driver may enjoy his/her music or news during his/her driving without being interrupted by unnecessary traffic information and the driver may reliably obtain necessary information regarding a congested area.

In one embodiment, the present invention provides a navigation system for a vehicle, comprising: a communication section for receiving traffic information from a radio station and current traffic information from a road traffic information center; a coverage determining device for determining whether the vehicle is located within the area of coverage of the radio station, in accordance with the reception of the radio signal received from the radio station; an audio output determining device for determining whether current traffic information which is received from the road traffic information center by the communication section satisfies a predetermined audio output condition for specifying a congested area; and an audio output processing device for outputting the traffic information which is received from the radio station by the communication section, as audio guidance, provided that the audio output determining device determines that the audio output condition is met while the vehicle is located within the area of coverage of the radio station.

In another embodiment, the present invention is a navigation system for a vehicle which comprises: a current location detecting device for detecting a current location of the vehicle; a data storage section for storing data defining coverage area of a radio station; a communication section for receiving traffic information from the radio station and current traffic information from a road traffic information center; a coverage determining device for determining whether the vehicle is located within the area of coverage defined by data stored in the data storage section, based on a detection signal provided by the current location detecting device; an audio output determining device for determining whether the current traffic information which is received from the road traffic information center by the communication section satisfies a predetermined audio output condition for specifying a congested area; and an audio output processing device for outputting the traffic information which is received from the radio station by the communication section, as audio guidance, when the audio output determining device determines that the audio output condition is met while the coverage determining device determines that the vehicle is located within the area of coverage of the radio station.

In yet another embodiment, the present invention provides a navigation system for a vehicle, comprising: a communication section for receiving traffic information from a radio station and current traffic information from a road traffic information center; an audio output determining device for determining whether the current traffic information which is received from the road traffic information center by the communication section satisfies a predetermined audio output condition for specifying a congested area; an audio output device for outputting the traffic information which is received from the radio station by the communication section, as audio guidance, when the audio output determining device determines that the audio output condition is met; and a storage device for storing the traffic information which is received from the radio station by the communication section when the audio output determining device determines that the audio output condition is not met; wherein the audio output device outputs the stored traffic information, as audio guidance, when the vehicle is outside of the area of coverage of the radio station.

In another embodiment, the present invention provides a navigation system for a vehicle, comprising: a current location detecting device for detecting current location of the vehicle; a data storage section for storing map data necessary for searching for a route and data defining an area of coverage of a radio station along the searched route, on the basis of map data; a communication section for receiving traffic information from the radio station and current traffic information from a road traffic information center; a coverage determining device for determining whether or not the vehicle is currently located within the coverage area of the radio station for which data is stored in the data storage section, on the basis of a detection signal from the current location detecting device; an audio output determining device for determining whether the current traffic information, which is received from the road traffic information center by the communication section, satisfies a predetermined audio output condition for specifying a congested area when the coverage determining device determines that the vehicle is located within the area of coverage; a display device for displaying a message on a screen to let the driver know that the traffic information received from the radio station by the communication section is ready for output as audio guidance, responsive to the driver's instruction, when the audio output determining device determines that the audio output condition is met; a storage device for storing the traffic information received from the radio station by the communication section when the audio output determining device determines that the audio output condition is not satisfied; a display control device for displaying a message on the display device to let the driver know that traffic information which is stored in the storage device is ready for output as audio guidance, responsive to the driver's instruction, when the coverage determining device determines that the vehicle is not located within the area of coverage of the radio station; and an audio output device for outputting the traffic information which is received from the radio station as audio guidance, responsive to the driver's input through an operating section displayed on the screen of the display device.

Accordingly, in an embodiment of the present invention, traffic information which is received by the communication section may be announced with audio guidance responsive to the driver's input, only when the current traffic information which is received within the coverage area of the radio station includes information regarding a predetermined congested area on the vehicle's travel route. Therefore, the driver may enjoy music or news during his/her driving without being interrupted by unnecessary traffic information. Further, when the driver wants to be informed of area(s) of congestion due to traffic control, a traffic accident, or road construction, the driver may reliably obtain necessary traffic information regarding the congested area. When the vehicle is located out of the coverage area of the radio station, traffic information, which was received by the receiver while the vehicle was within the coverage area, may be announced with audio guidance responsive to the driver's request, so that the driver may know of the existence of the congested area on the route which the vehicle will travel.

DESCRIPTION OF PREFERRED EMBODIMENTS

Figure 1A:
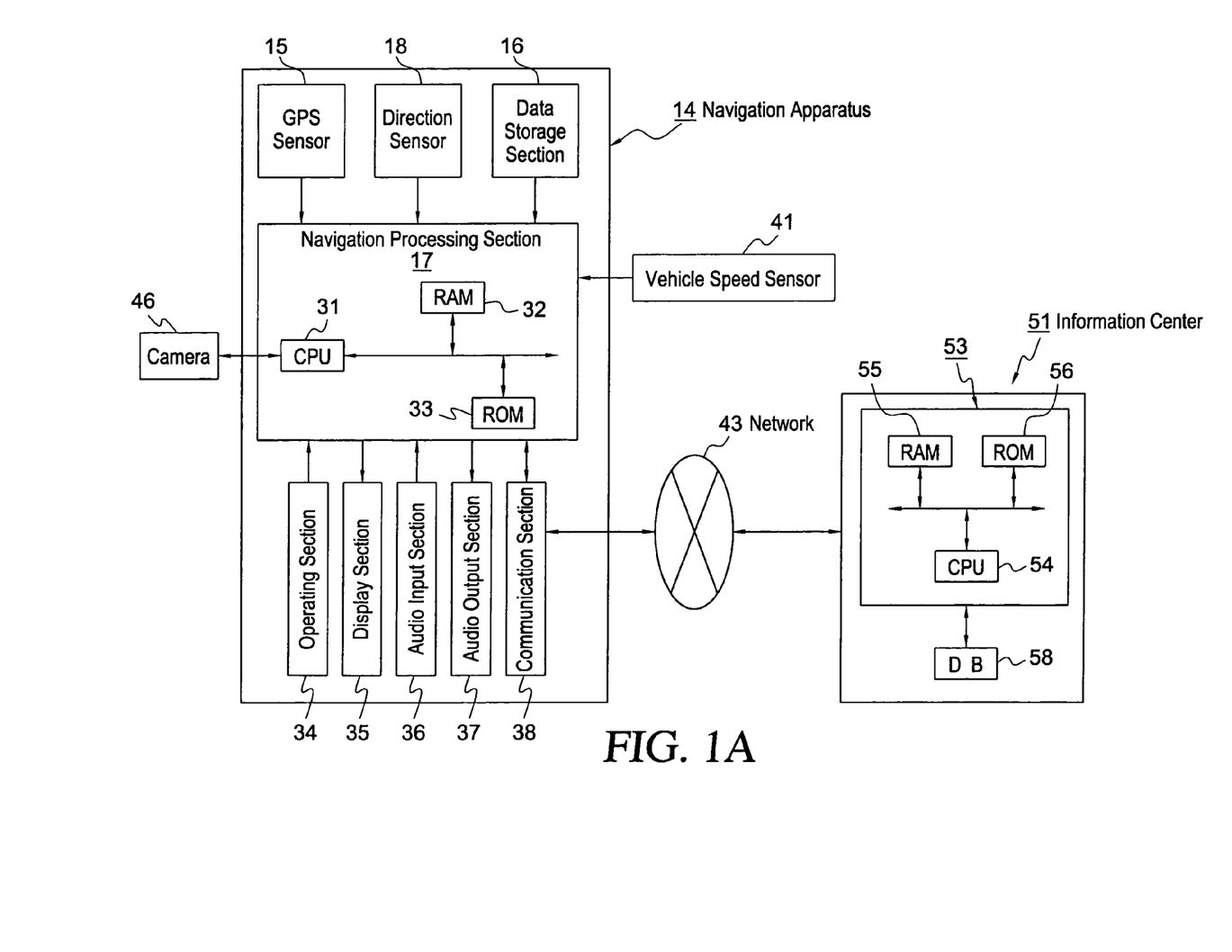
FIG. 1A is a block diagram of a navigation system according to an embodiment of the invention.

FIG. 1 shows an embodiment of the invention including a navigation apparatus 14 used as an in-vehicle information terminal, a network 43, and an information center 51.

The navigation apparatus 14 may include a GPS sensor 15 for detecting a current location of the vehicle, a data storage section 16 for storing map data with various information, a navigation processing section 17 for executing navigation and various types of calculation routines, a direction sensor 18 for detecting direction of the vehicle, an operating section 34 for receiving input from the driver, a display section 35 for display of various images, an audio input section 36 for inputting audio data, an audio output section 37 for outputting audio guidance, in the form of various items of information, to the driver, and a communication section 38 functioning as a communication terminal. The navigation processing section 17 in the navigation apparatus is connected to the GPS sensor 15, the direction sensor 18, the data storage section 16, the operating section 34, and the audio input section 36 at an input side thereof and is connected to the display section 35 and the audio output section 37 at an output side thereof. The communication section 38 is connected to the navigation processing section 17 through input and output terminals. The navigation processing section 17 is further connected to a vehicle speed sensor 41 for detecting the vehicle speed and to a camera 46 for taking an image of the area surrounding the vehicle. The camera 46 includes a CCD and/or a C-MOS and takes an image of a congestion information signboard located along the travel route of the vehicle and sends the image data to the navigation processing section 17.

The GPS sensor 15 has a function of receiving a signal from a satellite for calculating the absolute location, of the vehicle and for detecting the current location while calculating the travel speed and the travel direction of the vehicle. The direction sensor 18 is a geomagnetic sensor for calculating the absolute travel direction of the vehicle or for detecting the travel direction of the vehicle on the basis of the change in direction calculated by the gyro sensor or the GPS sensor. The data storage section 16 includes a map database with a map data file in which map data is stored, radio station data including location of a radio station which broadcasts traffic information, coverage area of the radio station and reception frequency, output data for outputting predetermined information from the audio output section 37, a statistical database with a statistical data file, and a travel history database with a travel history data file. The map data further includes intersection data, node data, road data for road links, search data for searching for a route, and facility data.

The stored statistical data includes traffic information which was previously provided by a road traffic information center (VICS), traffic volume data obtained from road traffic census provided by the Ministry of Land, Infrastructure and Transport, and history information such as road timetable information. For each of a plurality of data items, link number data for each road link on routes along which the vehicle has traveled in the past, a direction flag indicating the travel direction, type of information, degree of congestion at a predetermined time, link travel time indicating the time required to traverse a road link, and an average link travel time for each day of the week. In this case, the congestion degree stored as an item of data indicates congestion as one of three levels, that is, "not congested", "congested", and "crowded".

Travel history data stored in the travel history database is calculated and stored on the basis of travel data recorded along the route of travel of the vehicle. The link travel times required to traverse each road link and the corresponding congestion degree are stored as data items.

The data storage section 16, in which the various data items are stored, includes a flash memory, RAM, a hard disk, a CD, a DVD, or an optical disk. According to the present embodiment, the various items of data described above are stored in the data storage section 16. However, the same data may be obtained from the information center 51.

Figure 1B:
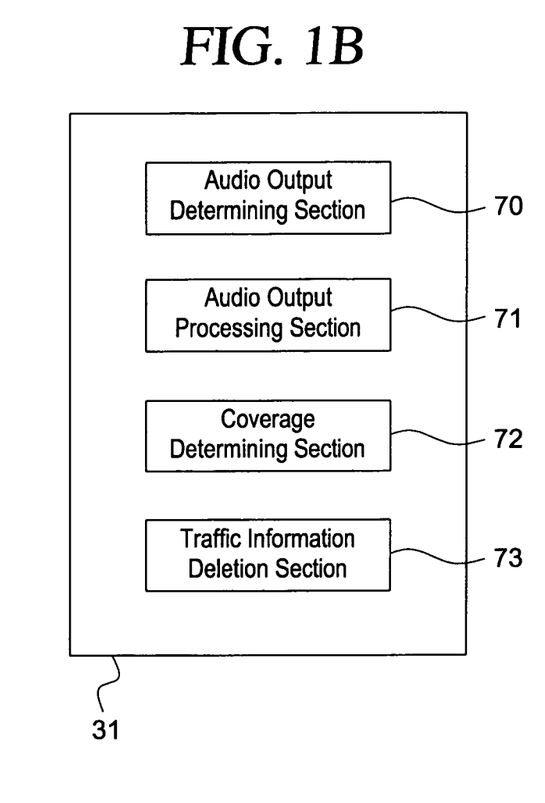
FIG. 1B is a block diagram of CPU 31 in FIG. 1A.

The navigation processing section 17 includes a CPU 31 for executing various types of calculations, a RAM 32 functioning as a working memory for the execution of calculations by the CPU, a ROM 33 for storing various programs for route searching and route guidance to a destination, together with a control program, and a flash memory for storing the various data and programs described above.

The operating section 34 is, for example, a keyboard or a mouse and is mounted next to the display section 35 for operation by the driver. More specifically, the operating section 34 is operated by the driver to correct the current location at the start of travel, when a starting point and a destination are set, when a passing point is set, or when the communication section 38 is operated. A touch panel is used as the operating section 34. The touch panel is a screen of the display section 35 and has image operating sections such as various types of keys, switches, or buttons. By touching or clicking such keys, switches, or buttons, input may be executed.

The display section 35 provides displays of the current location of the vehicle, a map, a searched route, guidance information for the searched route, traffic information regarding the searched route, distance to an intersection along the route, and/or a travel direction at the next intersection may be displayed. Further, operating guidance, an operating menu, and key guidance for the operating section 34 or the audio input section 35 may be displayed. Programs of radio stations may be displayed as well.

The audio input section 36 is a microphone allowing the driver to input necessary audio information. The audio output section 37 includes a speaker and a voice synthesizer (not shown). The voice synthesizer of the audio output section 37 produces synthesized voice information regarding the searched route, guidance information, and/or traffic information and the synthesized voice information is output from the speaker.

Figure 1C:
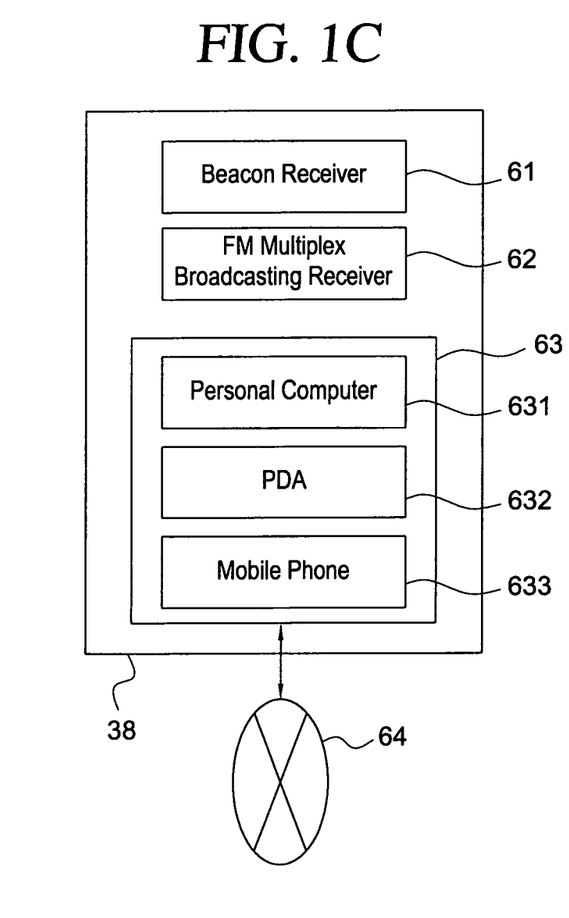
FIG. 1C is a block diagram of communication section 38 in FIG. 1A.

The communication section 38 includes a radio receiver 65 for receiving audio traffic information from a radio station, a beacon receiver 61 for receiving current traffic information, originating from the road traffic information center, through an electric wave beacon device or an optical beacon device which is mounted along the travel route, or a radio receiver 62 for receiving current road traffic information from a traffic information service (Radio Data System-Traffic Message Channel) through FM multiplex broadcasting. The communication section 38 further includes an information receiver 63 such as a PC 631, a PDA 632, or a mobile phone 633 for obtaining current road traffic information through the internet 64. The road traffic information includes congestion information, traffic control information, parking information, traffic accident information, and parking area congestion information.

The road traffic information includes information type indicating the type of information, a grid number for specifying a grid area for indicating a predetermined region, link number data for specifying a road link which connects two points (for example, two intersections) with each other and for indicating outbound or inbound routes, and link information correlated with link number data. For example, when congestion information is provided as traffic information, congestion starting point data indicating a distance from a starting point of a road link to a starting point of a congested area, congestion degree, congestion length indicating the distance covered by the congested area, and a link travel time may be displayed as link information.

The information center 51 includes a server 53 and a database (DB) 58, serving as a communication section and as an information storage section, connected to the server 53. The server 53 further includes a CPU 54, a RAM 55, and a ROM 56. The database 58 stores data similar to that stored in the data storage section 16 of the navigation apparatus 14. The information center 51 provides real-time travel history data which is collected from a plurality of vehicles (the vehicle in which the navigation system is installed and other vehicles).

The basic operation of the navigation system which serves as a route guidance system according to the present embodiment will now be described below. When the navigation apparatus 14 is activated by input through the operating section 34 by the driver, the CPU 31 initializes the navigation program while reading the current location of the vehicle as detected by the GPS sensor 15 and the travel direction of the vehicle 25 detected by the direction sensor 18 and initializing the various data. The CPU 31 executes a matching routine to specify the current location of the vehicle. More specifically, the CPU 31 determines whether the current location is located on a road link on the basis of road link shape and arrangement of the road links along a road within an area surrounding the read current location.

Next, the CPU 31 executes a routine to obtain basic information and reads map data from the data storage section 16 or obtains the map data from the information center 51 through the communication section 38. When map data is obtained from the information center 51, the CPU 31 downloads the received map data into the flash memory while obtaining the control program for the map data.

The CPU 31 executes a map data display routine to display a map on the display of the display section 35, with display of the current location of the vehicle, the travel direction of the vehicle, and an area map depicting the area surrounding the vehicle on the map screen. The driver may thereby visually check the location of the vehicle, the travel direction of the vehicle, and the area map.

When the driver uses the operating section 34 to input a destination, the CPU 31 executes a destination setting routine to set the destination. In this case, a predetermined point which has been registered in advance may be set as the destination. When the driver inputs a search condition, the CPU 31 executes a search condition setting routine to set the search condition. After the destination and the search condition are set, the CPU 31 executes a route search routine and reads the current location of the vehicle, the destination, and the search condition while reading out search data from the data storage section 16. The CPU 31 searches for a route from the current location to the destination in accordance with the search condition on the basis of the read out search data and outputs route data indicating the searched route, i.e. the route determined by the search. In this case, the one route which has the minimum total link cost of all road links along the route is determined as the searched route from among a plurality of possible routes. The CPU 31 executes a route display routine and displays the searched route on the map screen displayed by the display section 35, on the basis of the read route data. The CPU 31 executes an audio output routine to output audio guidance for the searched route from the audio output section 37, in accordance with the input through the operating section 34.

When the CPU 31 sends the current location, the destination, and the search condition to the information center 51, the CPU 54 of the information center 51 executes a route search routine in the manner of the CPU 31 as described above and reads the current location, the destination, and the search condition while reading out search data from the database 58. The CPU 54 searches for a route from the current location to the destination, in accordance with the search condition, on the basis of the read out data and outputs route data indicating the searched route. The route data is transferred to the communication section of the navigation apparatus 14 by the CPU 54. As described above, the CPU 31 of the navigation processing section 17 executes a route display routine, reads route data and displays the searched route on the map screen displayed by the display section 35.

Figure 2:
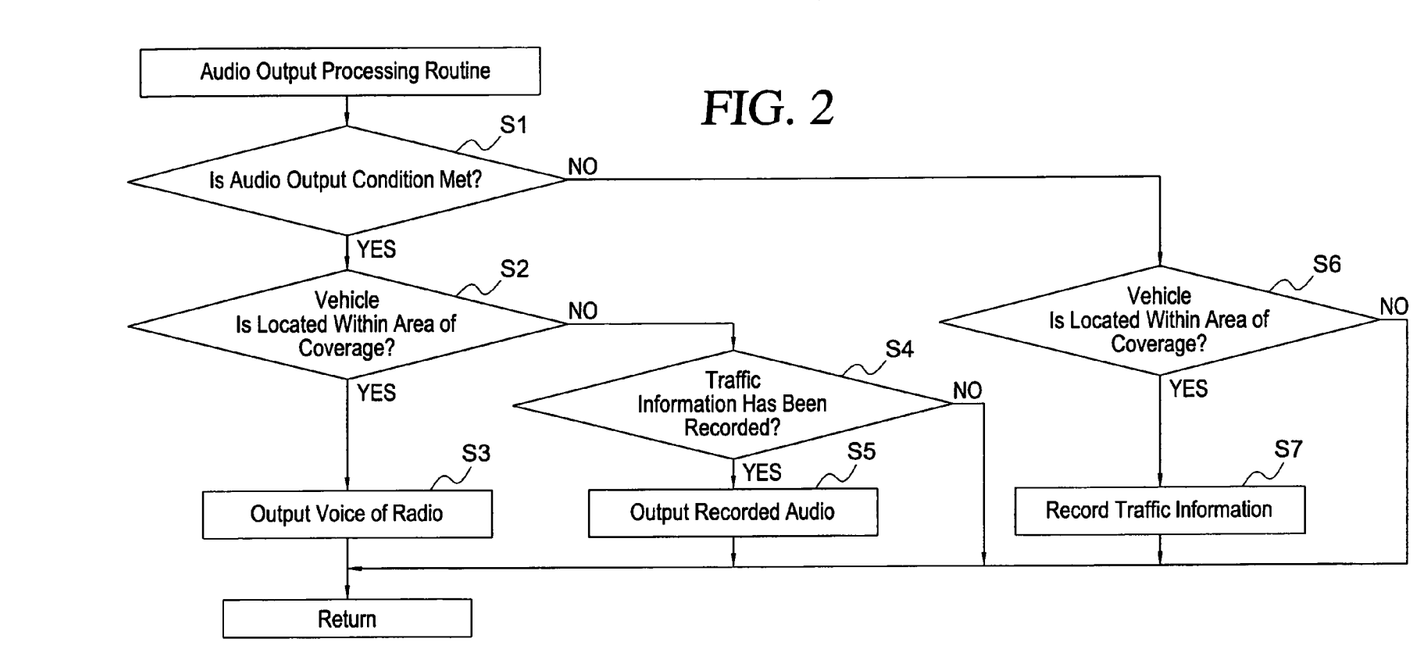
FIG. 2 is a flowchart of a program for audio output processing executed by the navigation processing section in FIG. 1.

During travel along the searched route which is displayed on the map by the display section 35, when the vehicle enters the area of coverage of a radio station, a radio receiver 62 or 65 of the communication section 38 receives traffic information which is automatically output from the speaker of the audio output section 37. However, if the driver is listening to music or radio news at this moment, unnecessary audio traffic information interrupts the music or news and it might decrease the driver's alertness during his/her driving. Accordingly, when the beacon receiver 61 and the radio FM multiplex broadcasting receiver 62 in the communication section 38 receive traffic information from the road traffic information center such as traffic congestion information and/or traffic regulation information while the vehicle is traveling the searched route, an audio output determining section 70 of the CPU 31 of the navigation system, according to the present embodiment, executes an audio output routine as shown in the flowchart of FIG. 2, so that the driver is given audio traffic congestion information only if a certain condition(s) is satisfied.

The audio output routine executed by the audio output determining section 70 of CPU 31 will now be described in detail with reference to the flowchart in FIG. 2. In Step S1 the CPU 31 determines audio output conditions as follows, in accordance with the traffic information such as traffic congestion information or traffic control information which is received from the beacon receiver 61 and the radio FM multiplex broadcasting receiver 62 in the communication section 38.

The first audio output condition is:
that there is a difference equal to or greater than a predetermined difference between current traffic information (which may include traffic information which is received from the radio FM multiplex broadcasting receiver 62 or the beacon receiver 61, or traffic information which is obtained from the Internet 64) and statistical data stored in the data storage section 16.

The second audio output condition is:
that it is determined that the vehicle is stopped pauses or slow-moving on an expressway or a toll way, on the basis of the vehicle speed calculated by the vehicle speed sensor 41 or the GPS sensor.

The third audio output condition is:
that the camera 6 captures an image of a congestion information signboard located along the travel route and information regarding a congested area, an accident, or road construction is displayed on the screen of the display section 35.

The fourth audio output condition is:
that the beacon receiver 61 of the communication section 38 has received more current (new) traffic information from the road traffic information center or the information center 51, or that the radio FM multiplex broadcasting receiver 62 has received more current (new) traffic information, or that an information terminal device 63 such as a PC, a PDA, or a mobile phone receives the latest traffic information from the Internet.

The fifth audio output condition is:
that the vehicle enters the congested area which is announced on the basis of traffic information which the beacon receiver 61 of the communication section 38 receives from the road traffic information center or the information center 51 or on the basis of data for the congested area stored as traffic information in the statistical data.

The sixth audio output condition is:
that the beacon receiver 61 of the communication section 38 receives traffic information for a congested area, an accident, or road construction from the road traffic information center or the information center 51, or that the radio FM multiplex broadcasting receiver 62 receives traffic information for a congested area, an accident, or road construction.

The seventh audio output condition is:
that the current location of the vehicle detected by the current location detecting device indicates that the vehicle is approaching a congested area, an accident, or road construction for which information has been received by the radio FM multiplex broadcasting receiver 62, the beacon receiver 61, or the Internet 64.

Figure 3:
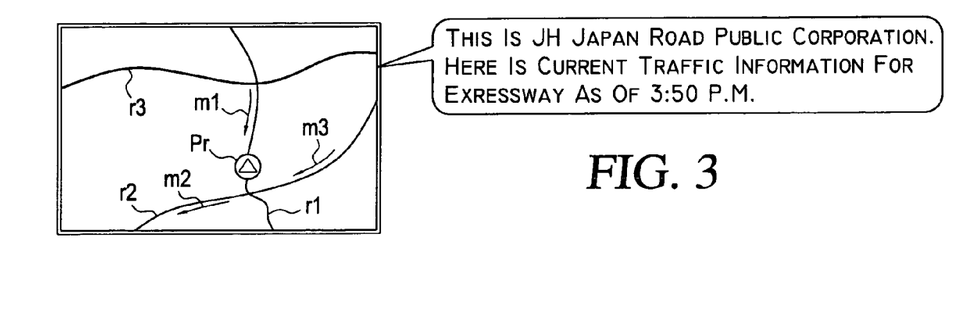
FIG. 3 is a diagram of a road map displayed on a screen of a display section as shown in FIG. 1 and audio guidance.

When any one of the audio output conditions described above is met, the CPU 31 determines "Yes" in Step S1 and then the coverage determining section 72 determines whether the vehicle is located within the coverage of the radio station in Step S2. There are two ways for coverage determining section 72 of the CPU 31 to detect the coverage of the radio station. One way is to obtain data for the location of the radio station, the coverage, and the reception frequency from the data storage section 16. The other way is for the coverage determining section 72 of the CPU 31 to determine the coverage of the radio station on the basis of the reception received from the radio station. After detecting the coverage of the radio station, the CPU 31 makes the determination in Step S2 and if that determination is "Yes", an audio output processing section 71 of the CPU 31 outputs audio traffic information regarding the congested area from the speaker of the audio output section 37 in Step S3. For example, as shown in FIG. 3, while the searched route is displayed on the screen of the display section 35, audio guidance such as "This is JH Japan Highway Public Corporation. Here is traffic information as of 3:50 p.m." is announced to the driver.

When the vehicle is traveling outside of the coverage of the radio station, coverage determining section 72 of the CPU 31 determines "No" in Step S2 and determines whether or not traffic information regarding the congested area has been received from the road traffic information center or the information center 51 in Step S4 and stored in the RAM 32. If the determination by the CPU 31 is "Yes" is step S4, the traffic information regarding the congested area which has been stored in the RAM 32 in advance is output as audio guidance from the speaker of the audio output section 37. In a manner similar to the procedure described above, for example, as shown in FIG. 3, while the searched route is displayed on the screen of the display section 35, audio guidance such as "This is JH Japan Highway Public Corporation. Here is traffic information as of 3:50 p.m." is announced to the driver. Therefore, the driver may learn congestion information for the travel route (searched route) even when the driver is outside of the coverage of the radio station.

When any one of the audio output conditions is not met during audio output processing by the audio output processing section 71, the CPU 31 determines "No" in Step S1 and then, in Step S6 determines whether the vehicle is located within the coverage of the radio station. When the determination is "Yes" in Step S6, in Step S7 the CPU 31 stores, in the RAM 32, traffic information, which includes traffic congestion information and traffic control information received from the beacon receiver or the radio FM multiplex broadcasting receiver 62 in the communication section 38. As a result, in Step S4 the determination becomes "Yes", so that in Step S5 traffic congestion information which has been stored in advance in the RAM 32 is output as audio guidance from the speaker of the audio output section 37.

Figure 4:
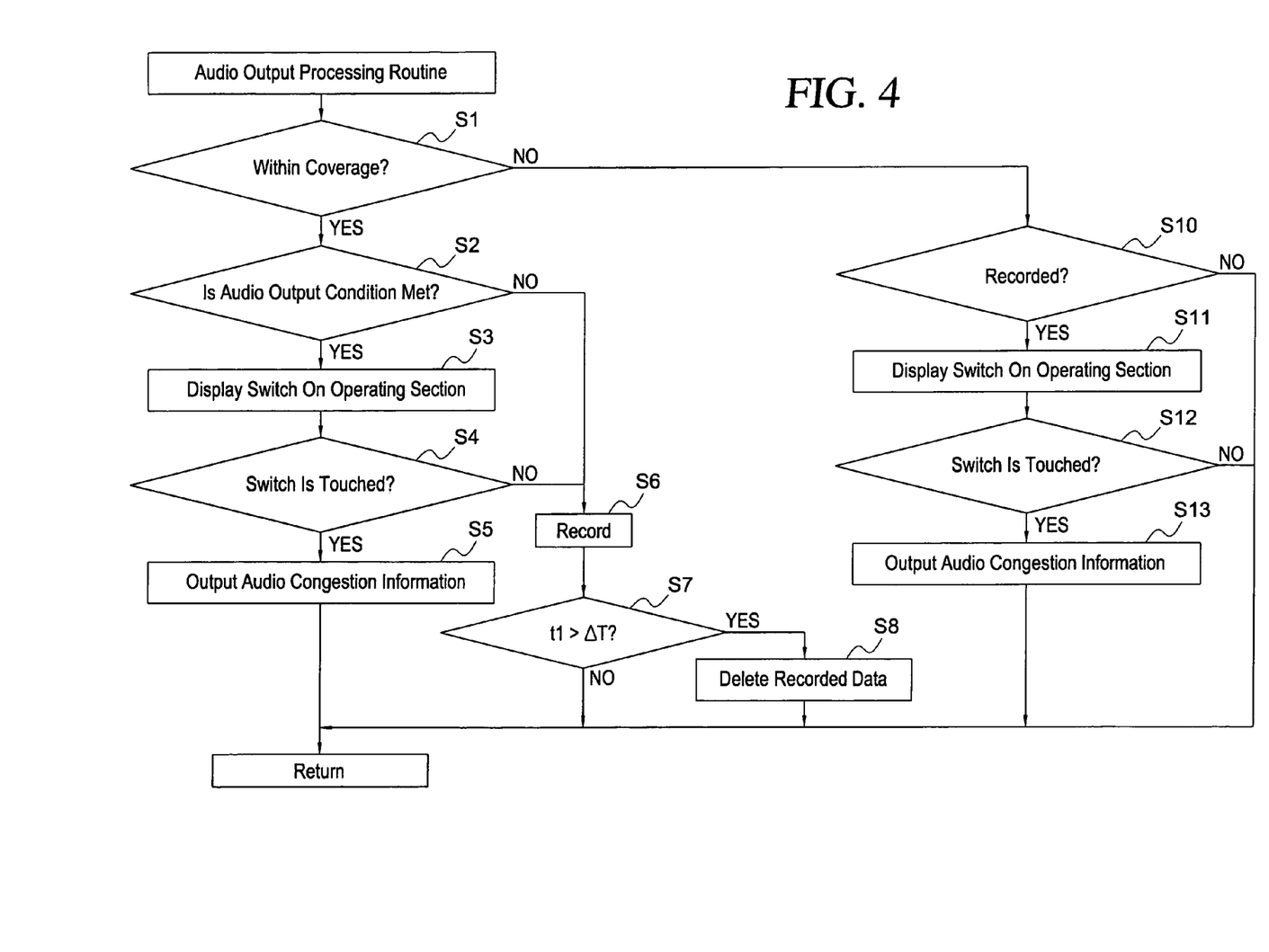
FIG. 4 is a flowchart of a program for audio output executed by the navigation processing section in FIG. 1 according to another embodiment of the invention.

According to another embodiment of the invention, the audio output routine illustrated in FIG. 4 may be used instead of the audio output routine illustrated described above. According to the audio output routine shown in FIG. 4, in Step S1 the CPU 31 determines whether or not the vehicle is located within the coverage of the radio station. When the determination is "Yes", the CPU 31 proceeds to Step S2 where it determines whether or not the same audio output conditions as in the above-described embodiment have been met, based on the traffic information which is received by a radio receiver of the communication section 38.

Figure 5:
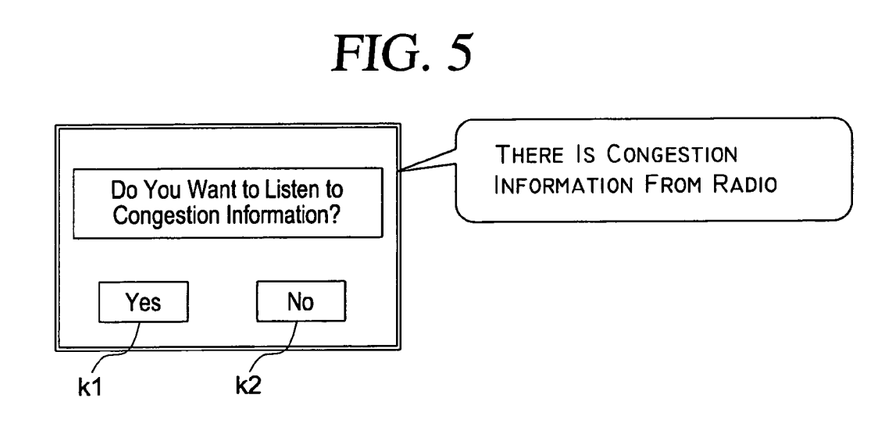
FIG. 5 is a diagram of an operating section which is displayed on the screen of the display section in FIG. 1.

If any one of the conditions is met, the CPU 31 determines "Yes" in Step S2 and in Step S3 displays a switch k1 which indicates "Yes" and a switch k2 which indicates "No" on the screen of the display section 35, as shown in FIG. 5. When the driver touches the switch k1 which indicates "Yes", the CPU 31 determines "Yes" in Step S4 and in Step S5 announces audio traffic information regarding the congestion from the speaker of the audio output section 37. For example, as shown in FIG. 3, while the searched route is displayed on the screen of the display section 35, audio guidance such as "This is JH Japan Highway Public Corporation. Here is traffic information as of 3:50 p.m." is announced to the driver. When the driver touches the switch k2 which indicates "No", the determination in Step S4 is "No" and in Step S6 the traffic information regarding the congested area is stored in the RAM 32 of the navigation processing section 17. Note that, when the determination is "No" in Step S2, the traffic information received from the road traffic information center or the information center 51 in Step S6 is stored in the RAM 32 of the navigation processing section 17.

Figure 6:
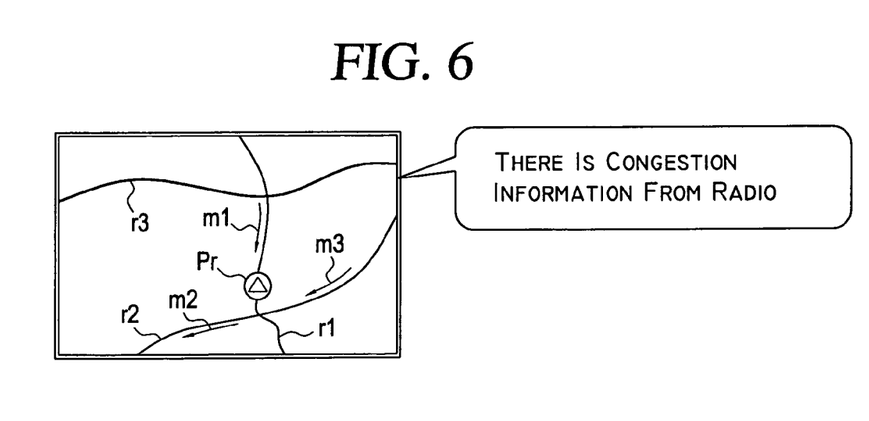
FIG. 6 is a diagram of a road map displayed on the screen of the display and the audio guidance, responsive to input by the driver through the operating section in FIG. 5.

When the vehicle is traveling outside of the area of coverage of the radio station, the determination is "No" in Step S1 and in Step S10 the CPU 31 then determines whether or not the traffic information received from the road traffic information center or the information center 51 has been stored in the RAM 32. When the determination in Step S10 is "Yes", as shown in FIG. 5, the switch k1 which indicates "Yes" and the switch k2 which indicates "No" are displayed on the screen of the display of the display section 35 in Step S11. As a result, when the driver wants to know if there is traffic congestion on the travel route ahead of the vehicle, the driver touches the switch k1 which indicates "Yes". The CPU 31 then determines "Yes" in Step S12, and the traffic information regarding the traffic congestion which has been stored in the RAM 32 is announced with audio guidance from the speaker of the audio output section 37 in Step S13. For example, as shown in FIG. 6, while the searched route is displayed on the screen of the display section 35, guidance such as "There is congestion information to be announced" is audibly output to the driver. When the driver touches the switch k2 which indicates "No", the CPU 31 determines "No" in Step S12 so that the audio output routine described above is repeated.

Note that, at the time the CPU 31 stores the traffic information which is received from the road traffic information center or the information center 51 in step S6 by audio output processing, the CPU 31 starts to time and when a predetermined time period ΔT has elapsed subsequent to storage of the traffic information at a storage time t1, the traffic information is deleted from the RAM 32 in Step S7 by the traffic information deletion section 73. Thereby, traffic information determined in Step S2 is continuously updated while the vehicle is traveling so that the latest traffic information is always available.

As will be appreciated from the foregoing, according to the present invention, when the audio output routine is executed during the travel of the vehicle and when it is determined that any one of the audio output conditions for traffic congestion is met in Step S2 of FIG. 2, the switches which allow the driver to determine whether or not to listen to the information regarding traffic congestion are displayed on the screen of the display section 35. The driver touches one of the switches and may thereby listen to the information regarding traffic congestion, as needed. Even when the vehicle is traveling outside of the area of coverage of the radio station, the driver may still obtain the latest traffic information regarding traffic congestion with audio guidance by one touch of the switch displayed on the screen of the display section 35 in Step S11.

Figure 7:
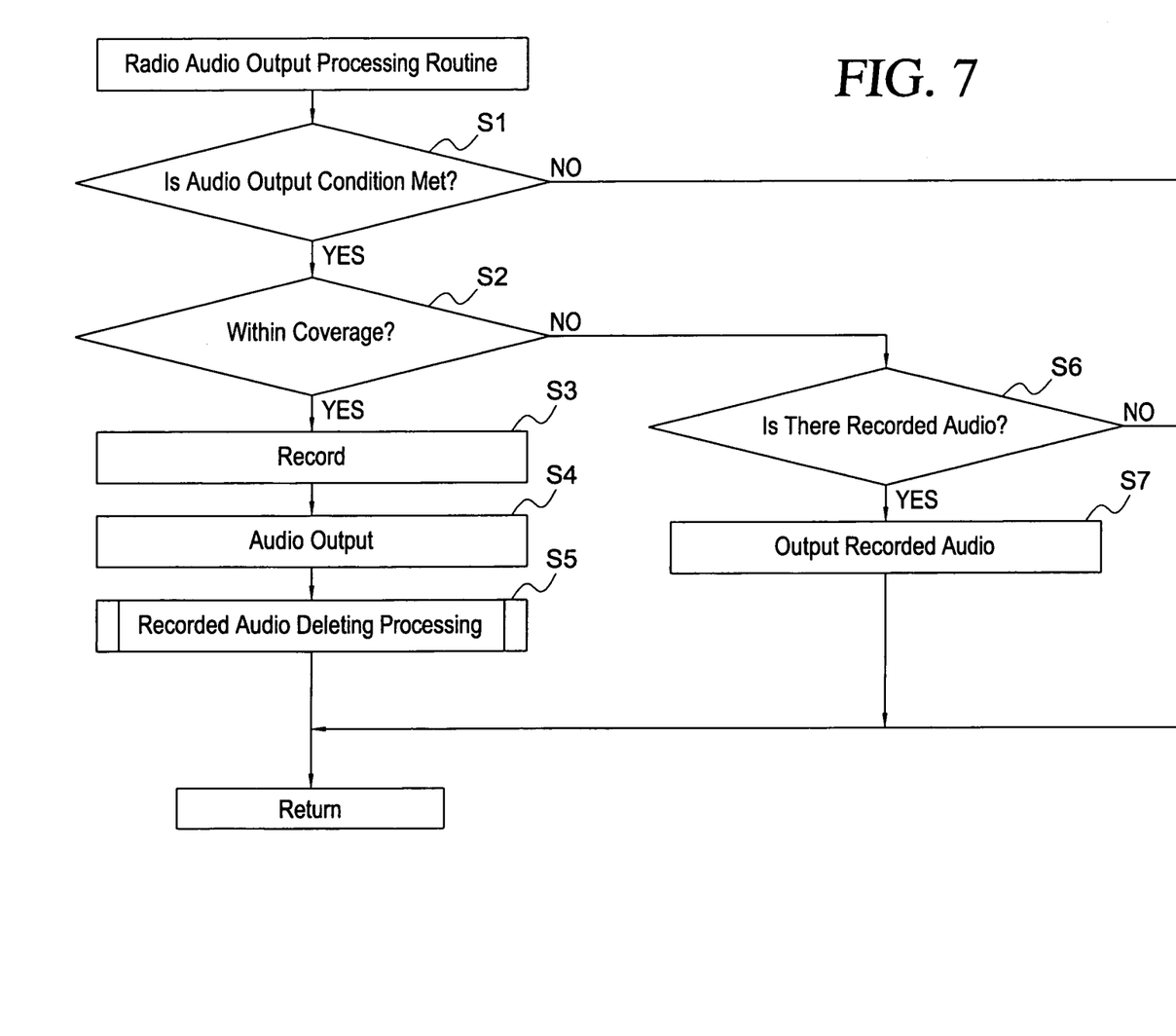
FIG. 7 is a flowchart of a modified embodiment of the audio output program illustrated in FIG. 2.

According to another embodiment of the present invention, the audio output routine illustrated in FIG. 7 is used instead of the audio output routine illustrated in FIG. 2. In the audio output routine of in FIG. 7, when any one of the audio output conditions described above is met, the CPU 31 determines "Yes" in Step S1 and then in Step S2 determines whether the vehicle is located within the area of coverage of the radio station. When the determination in Step S2 is "Yes", in Step S3 the CPU 31 stores, in the RAM 32, information regarding traffic congestion, which is received from the radio station by the communication section 38 and in Step S4 announces the information regarding traffic congestion to the driver with audio guidance from the speaker of the audio output section 37. Next, in Step S5 the traffic information deletion section 73 of the CPU 31 deletes the previously stored audio data, subject to a determination of whether or not deletion conditions described below are met. When it is determined that the deletion conditions are met, traffic information stored in the RAM 32 is deleted. The deletion conditions are:

1) a predetermined time period has elapsed since the communication section 38 has received traffic information;

2) the vehicle has moved a predetermined distance from the location at which the communication section 38 received the traffic information;

3) the vehicle has moved away from a predetermined corresponding area of coverage which is set for every point at which the communication section 38 has received traffic information.

According to the condition 1, the CPU 31 stores the time when the communication section 38 receives traffic information and calculates the time period elapsed from that time. According to the condition 2, the CPU 31 stores coordinates of the point at which the communication section 38 receives traffic information and calculates the distance from that reception point to the current location of the vehicle. According to the condition 3, the CPU 31 tracks the current location of the vehicle, as detected by the current location detector, and determines whether the current location of the vehicle is within a predetermined area of coverage of the radio station, a coverage area having been predetermined for every point (location) at which traffic information has been stored in the data storage section 16.

Therefore, after traffic information which has been stored in the RAM 32 is updated in Step S5, in accordance with the movement of the vehicle, the audio output conditions are repeatedly determined in Step S1.

When the determination is "Yes" in Step S1, if the vehicle is traveling outside of the area of coverage of the radio station, the CPU 31 determines "No" in Step S2 and then in Step S6 further determines whether traffic information which has been received from the radio station in advance is stored in the RAM 32. When the determination is "Yes" in Step S6, in Step S7 the CPU 31 announces the traffic information received from the radio station to the driver with audio guidance from the speaker of the audio output section 37. Thereafter, the traffic information deletion section 73 of the CPU 31 executes audio data deleting in Step S5 and repeatedly determines the audio output conditions in Step S1. When the determination is "No" in Step S6, the traffic information deletion section 73 of the CPU 31 executes audio deleting in Step S5 and repeatedly determines the audio output conditions in Step S1.

Figure 8:
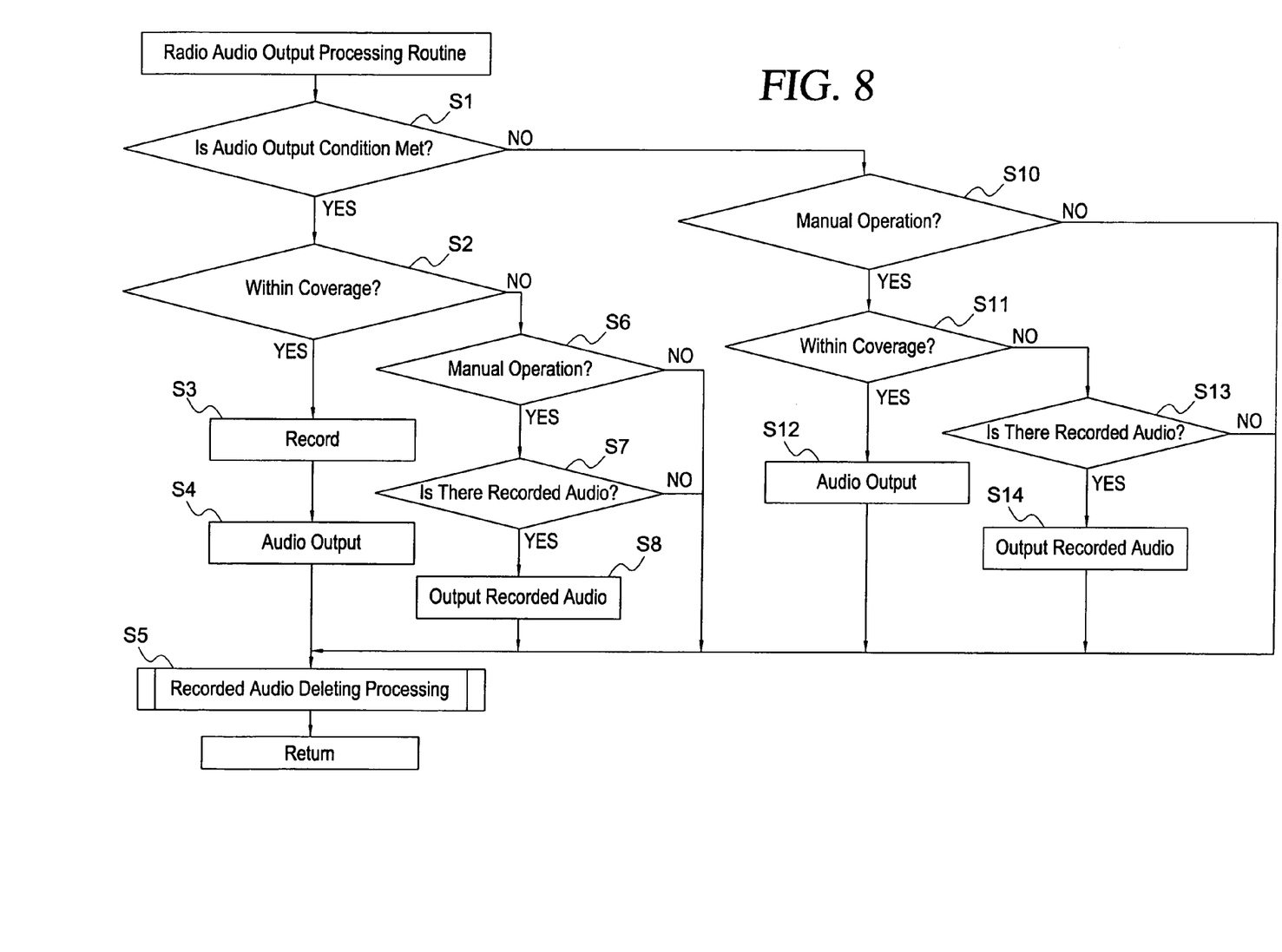
FIG. 8 is a flowchart of a modified embodiment of the audio output program illustrated in FIG. 2.

In another embodiment of the present invention, the audio output program illustrated in FIG. 8 is used. According to the audio output program of FIG. 8 Steps S1 through S5 are the same as Steps S1 through S5 in the audio output control program in FIG. 7, that is, the CPU 31 announces traffic information received from the radio station, with audio guidance, from the speaker of the audio output section 37. When the determination is "Yes" in Step S1 according to the audio output processing program of FIG. 8, execution advances to Step S2 where the CPU 31 determines if the vehicle is traveling outside of the area of coverage of the radio station. If the determination is "No" in Step S2, in Step S6 the CPU 31 further determines whether or not the driver has touched an operating button arranged on the operation section 34 or operated a remote controller, in Step S6. When the determination in Step S6 is "Yes" in Step S6, in Step S7 the CPU 31 determines whether traffic information received from the radio station is stored in the RAM 32. When the determination is "Yes" in Step S7, in Step S8 the CPU 31 announces information regarding traffic congestion which has been stored in the RAM 32 to the driver, with audio guidance, from the speaker of the audio output section 37. Then the traffic information deletion section 73 of the CPU 31 executes the audio deletion in Step S5 and repeatedly determines the audio output conditions in Step S1.

When the determination is "No" in Step S1, in Step S10 the CPU 31 determines whether the driver has touched the operating button mounted on the operating section 34 or operated the remote controller in Step S10. When the determination in Step S10 is "Yes", in Step S11 the CPU 31 further determines whether the vehicle is located within the area of coverage of the radio station. When the determination is "Yes" in Step S11, in Step S12 the CPU 31 announces the information regarding traffic congestion received from the radio station, with audio guidance, from the speaker of the audio output section 37. Then, the traffic information deletion section 73 of the CPU 31 executes audio deletion in Step S5 and repeatedly determines the audio output conditions in Step S1. When the determination is "No" in Step S11, in Step S13 the CPU 31 determines whether traffic information received from the radio station is stored in the RAM 32. When the determination is "Yes" in Step S13, the CPU 31 announces the information regarding traffic congestion which has been stored in the RAM 32, with audio guidance, from the speaker of the audio output section 37 in Step S14. Then, the traffic information deletion section 73 of the CPU 31 executes the audio deletion in Step S5 and repeatedly determines the audio output conditions in Step S1. When the determination is "No" in Step S10, the traffic information deletion section 73 of the CPU 31 executes the audio deletion in Step S5 and repeatedly determines the audio output conditions in Step S1.

The invention claimed is:

1. A navigation system for a vehicle, comprising:
   a current location detector for detecting a current location of the vehicle;
   a data storage section for storing map data for use in searching for a route and coverage data for a radio station along a route for which data is included in the stored map data;
   a communication section for receiving traffic information which is broadcast from the radio station and current traffic information which is provided from a road traffic information center;
   an audio output determining section for determining whether an audio output condition is met;
   a coverage determining section for determining whether the current location of the vehicle is within an area of coverage of the radio station which is stored in the data storage section, in accordance with a detection signal from the current location detector;
   a display device for displaying a message on a screen to let a driver know that the traffic information which is received from the radio station by the communication section is ready for output as audio guidance responsive to a request from the driver, provided that the audio output determining section has determined that the audio output condition is met;
   a storage device for storing traffic information which is received from the radio station by the communication section, provided that the audio output determining section has determined that the current traffic information is not to be output because the audio output condition is not met;
   a display section for displaying a message on the screen of the display device to let the driver know that traffic information received from the radio station by the communication section is ready for output as audio guidance responsive to a request from the driver, provided that the coverage determining section has determined that the vehicle is not located within the area of coverage of the radio station; and an audio output section for outputting traffic information which is received from the radio station as audio guidance when the driver touches an operating area on the screen of the display device and switching between output of the traffic information as received and output of the stored traffic information, dependent on the determination by the coverage determining section.

2. A navigation system according to claim 1 wherein the audio guidance is voice guidance.

3. A navigation system according to claim 1 wherein the audio guidance is output while the route is displayed on a screen of a display section.

4. A navigation system according to claim 1 wherein traffic information stored in the storage device is always updated in accordance with traffic information newly received by the communication section as the vehicle is traveling.

5. A navigation system for a vehicle, comprising:
a current position detector device for detecting a current position of the vehicle;
a data storage section for storing map data for use in searching for a route and data for a radio station along a route for which data is included in the stored map data;
a communication section for receiving traffic information which is broadcast from the radio station and current traffic information which is provided from a road traffic information center;
an audio output determining section for determining whether an audio output condition specifying traffic congestion is met;
a coverage determining section for determining whether the current position of the vehicle is within an area of coverage of the radio station which is stored in the data storage section, in accordance with a detection signal from the current position detector;
a storage device for storing traffic information, which is received from the radio station by the communication section within the coverage of the radio station, provided that the audio output determining section has determined that the current traffic information is not to be output because the audio output condition is not met; and
an audio output section for either outputting traffic information as received from the radio station by the communication section, or outputting the traffic information stored in the storage device, dependent on the determination by the coverage determining section.

6. A navigation system according to claim 5 further comprising:
a display device for displaying a message on a screen to let a driver know that the traffic information which is received from the radio station by the communication section is ready for output as audio guidance responsive to a request from the driver, provided that the audio output determining section has determined that the audio output condition is met;
a display section for displaying a message on the screen of the display device to let the driver know that traffic information received from the radio station by the communication section is ready for output as audio guidance responsive to a request from the driver, provided that the coverage determining section has determined that the vehicle is not located within the area of coverage of the radio station; and
wherein the audio output section outputs traffic information which is received from the radio station as audio guidance when the driver touches an operating area on the screen of the display device.

7. A navigation system according to claim 5 wherein the audio guidance is voice guidance.

8. A navigation system for a vehicle according to claim 5, wherein the audio output determining section determines whether any one of the following audio output conditions is met:
there is a predetermined difference between current traffic information and statistical data stored in the storage device;
the vehicle is stopped or is slowing down on an expressway or a toll-way as detected by a vehicle speed sensor or a GPS sensor;
an in-vehicle camera captures an image of a congestion information signboard mounted along a traveling route and information of traffic congestion, an accident, or road construction is displayed thereon;
a beacon receiver of the communication section receives more current traffic information from an information center, a radio FM multiplex broadcasting receiver receives the more current traffic information, or the more current traffic information is received through the Internet by means of an information terminal device;
the vehicle enters a congested area, as determined from data for the congested area included in traffic information which is received from the information center by the beacon receiver of the communication section or included in traffic information stored as statistical data;
the communication section receives traffic information regarding a congested area, a traffic accident, or road construction from the information center, or from the FM multiplex broadcasting receiver; and
a current location of the vehicle which, as detected by the current position detector, is approaching a congested area, site of an accident, or road construction, based on traffic information received from the radio FM multiplex broadcasting receiver, the beacon receiver, or the Internet.

9. A navigation system according to claim 5 wherein the audio output condition that is determined by the audio output determining section is a predetermined difference between current traffic information and statistical data stored in a data storage section.

10. A navigation system according to claim 5 wherein the audio output condition that is determined by the audio output determining section is that, when an in-vehicle camera captures an image of a congestion information signboard mounted along a travel route, information indicating traffic congestion, an accident, or road construction is displayed on the signboard.

11. A navigation system according to claim 5 wherein the audio output condition determined by the audio output determining section is that a beacon receiver of the communication section has received more current traffic information from an information center, that a radio FM multiplex broadcasting receiver of the communication section has received the more current traffic information, or that the more current traffic information has been received through the Internet by means of an information terminal device of the communication section.

12. A navigation system according to claim 5 wherein the audio output condition determined by the audio output determining section is that the vehicle has entered a congested area, based on information of a congested area included in traffic information received from an information center by a beacon receiver of the communication section or based on traffic information stored in a statistical data file.

13. A navigation system according to claim 5 wherein the audio output condition determined by the audio output determining section is that a beacon receiver of the communication section has received traffic information regarding a congested area, a traffic accident, or road construction from an information center, or that a radio FM multiplex broadcasting receiver of the communication section has received traffic information regarding a congested area, a traffic accident, or road construction.

14. A navigation system according to claim 5 further comprising a traffic information deletion section for deleting traffic information stored in the storage device at certain intervals and for updating the traffic information to traffic information which is newly received by the communication section.

15. A navigation system according to claim 5, wherein:
the coverage determining section determines whether the vehicle is located within the area of coverage of the radio station on the basis of reception of the radio station by the communication section.

16. A navigation system according to claim 5 wherein the audio output condition determined by the audio output determining section is that a current position of the vehicle, as detected by the current position detector, is approaching a congested area, a location where an accident has not yet been cleared, or a road construction area, based on traffic information obtained from a radio FM multiplex broadcasting receiver, a beacon receiver, or Internet.

17. A navigation system according to claim 5 further comprising a traffic information deletion section for deleting traffic information stored in the storage section, at certain time intervals, and for updating the traffic information to that which is most recently received by the communicating section.

18. A navigation system according to claim 5 wherein:
the coverage determining section determines whether the vehicle is located within the area of coverage of the radio station on the basis of a detection signal from the current position detector.

\* \* \* \* \*